Aug. 9, 1938.   C. E. REED   2,126,035
EARTH BORING BIT
Filed Nov. 27, 1936
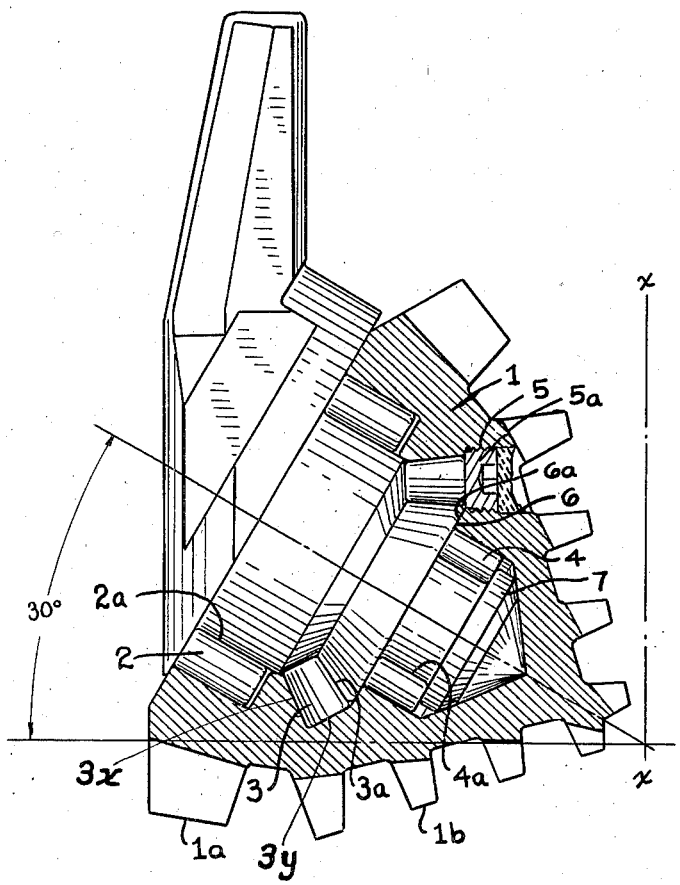
Clarence E Reed   INVENTOR Patented Aug. 9, 1938

2,126,035

UNITED STATES PATENT OFFICE 2,126,035

EARTH BORING BIT

Clarence E. Reed, Wichita, Kans., assignor to Chicago Pneumatic Tool Company, New York, N. Y., a corporation of New Jersey Application November 27, 1936, Serial No. 113,071

20 Claims. (Cl. 255—71).

The invention is an improvement upon the general form of earth boring bits employing frusto-conical anti-friction roller bearings.

The invention consists in the features and combination and arrangement of parts disclosed herein and particularly pointed out in the appended claims.

In the drawing, Fig. 1 is a central vertical sectional view of the cutter with the spindle, support and roller bearing organization shown partly in side elevation.

Referring to the drawing, the roller cutter 1 is of frusto-conical form, having a toothed base cutting zone 1a and a toothed frusto-conical apex cutting zone 1b. The invention is not limited to a frusto-conical cutter form. Cylindrical cutter form may be employed.

The two zones of the frusto-conical form of cutter are at an inclination to each other. The teeth of the base zone are comparatively wide and extend in planes radial from the axis of the cutter. The teeth of the frusto-conical apex zone are arranged in widely spaced apart circumferential rows. The cutter is in one piece.

It is well known in the art that a cylindrical cutter form rolling in a circular path on the bottom of the bore hole has a non-true rolling action resulting in the so-called "twisting" or scraping action on the formation at the bottom of the hole. A frusto-conical cutter form having a base cutting zone inclined to a frusto-conical apex cutting zone has similar "twisting" action of the cutter teeth, but modified in extent. The inclination of the cutter axis also modifies the cutting action possible to obtain in any given cutter.

In this invention, using a frusto-conical cutter form as shown in Fig. 1, the cutter axis is set at an inclination of thirty (30) degrees, as indicated on the drawing, which enables the use of a larger diameter frusto-conical cutter than has heretofore been used in frusto-conical cutter bits of this type. This setting of the axis of the cutter intensifies certain thrusts imposed upon the cutter in operation. The cutter teeth have greater differential of speed of travel, therefore of contact with the surface of bottom of hole in the different rows of teeth, and much greater and more rapid disintegration of the bottom of the bore hole results. The thrusts have been very severe on the bearings, particularly the end portion of the bearing towards the drill axis. The drill axis is indicated on the drawing by the line $x$—$x$. The usual form of bearing breaks down much too soon for efficient and sustained maintenance of the cutting capacity of the teeth.

In this invention frusto-conical roller bearings are employed with their larger ends positioned towards the axis of the drill and tapering towards the outer side of the drill. The bearing is thus increased in size and the thrusts tending to push the top portion of the cutter towards the drill axis are sustained by these tapered roller bearings, which also serve to rotatively lock the cutter on the spindle.

It will be noted that the spindle and support are integral, the cutter is in one piece and that all raceways are smooth, unbroken, uninterrupted surfaces throughout their extent. The cutter encloses the end of the spindle and presents a difficult problem of assembly solved by the arrangement of the parts of this invention.

As shown in the drawing, the spindle is integrally formed with its base or support, which has a shank extending upwardly to fit into a recess in the bit head, not shown, wherein it is suitably secured, as, for instance, by welding.

The spindle has a cylindrical raceway surface 2a thereon, also a frusto-conical raceway surface 3a and another cylindrical raceway surface 4a, a thrust shoulder 6a and a flange 7. The thrust shoulder 6a forms a friction bearing surface contacting a friction bearing surface of the cutter. The flange 7 retains the rollers 4 in position.

Cylindrical anti-friction rollers 2 are mounted on the raceway 2a, cylindrical rollers 4 are mounted on the raceway 4a, and frusto-conical rollers 3 are positioned on the raceway 3a.

The frusto-conical cutter has a bore conforming generally to the configuration of the spindle and anti-friction members above described. That is to say, it has a bore with raceway surfaces complementary to the raceway surfaces on the spindle, for instance, for the anti-friction roller bearings 2 and 4, and it has a groove wholly defined by two intersecting surfaces, each of which surfaces is inclined to the cutter axis. One of these intersecting surfaces is the raceway surface 3x for the frusto-conical roller bearings 3, and the other of these intersecting surfaces is that marked 3y adjacent the larger end face of the frusto-conical roller bearings 3. The bore of the cutter also has a thrust frictional bearing surface. The cutter has a bore hole 5, closed by a plug 5a. This bore hole is at an inclination to the axis of the spindle and registers with the frusto-conical space between the spindle and the cutter frusto-conical raceway surfaces. The frusto-conical roller bearings are inserted through this hole to their operating position, after which the hole is plugged. The plug 5a serves only to close the open hole, and has no other operating function, than to keep earth from entering. After the tapered rollers are inserted to their operating position between the frusto-conical raceway surfaces on the cutter and on the spindle, the interrelation of all parts is such that the cutter cannot come off the spindle because of compression of the tapered rollers through their peripheries contacting cutter and spindle. Holes through cutter shells have been used in this industry for inserting balls and rollers, but they are heretofore used in such manner that the operating loads imposed on the cutter had to be sustained in whole or in part by the plug which would loosen because it formed a part of the raceway. In this invention the position of the hole and the angle of its inclination to the raceway is such that the operating thrusts on the tapered roller bearings cannot be transmitted to the plug.

In assembling the organization, the cylindrical rollers are placed on their respective raceway surfaces and the cutter is positioned on the spindle and cylindrical rollers. The tapered rollers 3 are then inserted one at a time through the hole 5 and after all are in place, the plug 5a is inserted in the hole. The plug may be screw threaded, or welded, or both, to retain it.

It is of course well known that in the usual frusto-conical roller cutters there is a well defined end thrust of the cutter towards the support. Such end thrust varies directly with the angle of inclination of the cutter axis. In this invention and in combination with the assembly and the arrangement of the parts, the angle of inclination has been reduced from the usual 38 to 42.5 degrees to approximately 30 degrees, and this position of the frusto-conical cutter is so much more nearly approaching the vertical, that the thrusts of operation which tend to rotate the body of the cutter by pushing inwardly or outwardly axially are so much modified from the heretofore usual conditions that the general average conditions result in the end thrusts being largely reversed in direction. That is to say, the destructive, predominating end thrusts of the operations as they affect the body of the cutter tend to push it towards the axis of the drill to such extent that the end thrust bearing should be reversed from the usual practice. Therefore, in this invention, the main rolling end thrust bearing of the structure is positioned to sustain end thrust of the cutter towards the drill axis, and the end thrust of the cutter that may occur towards the support outwardly from the drill axis, is sustained by the spindle. Sufficient clearance is allowed at the ends of the rollers 2 so that the rollers will not be in compression endwise; the rollers 4 are relieved by the space and the flange 7, and the tapered rollers are relieved endwise so that all operating loads thereon are sustained by the periphery of the tapered rollers. The shoulder 6 also prevents any endwise compression of the tapered rollers. It is to be understood that the tapered rollers sustain radial thrusts in addition to end thrusts of the cutter.

I claim:

1. A roller cutter and roller bearing assembly for an earth boring drill comprising a cutter having its axis inclined approximately thirty degrees to a horizontal, a spindle, and tapered roller bearings positioned between the cutter and the spindle with their larger ends towards the axis of the drill.

2. A roller cutter and roller bearing assembly for an earth boring drill comprising a roller cutter, a spindle, a support, roller bearings adjacent the support and between the cutter and the spindle, and tapered roller bearings between the cutter and the spindle, said tapered roller bearings being positioned with their larger ends towards the axis of the drill.

3. A roller cutter and roller bearing assembly for an earth boring drill comprising a roller cutter, a spindle, a support, and two sets of rolling bearings between the cutter and the spindle, and a set of tapered roller bearings positioned between the sets of rolling bearings with the larger ends of said tapered roller bearings towards the axis of the drill.

4. A roller cutter and roller bearing assembly for an earth boring drill comprising a roller cutter, a spindle, a support, tapered roller bearings positioned with their larger ends towards the axis of the drill, and other rolling bearings between the cutter and the spindle.

5. A spindle support and spindle for an earth boring drill comprising a spindle body portion having thereon a frusto-conical raceway surface for roller bearings tapering towards the support, the spindle having a free end.

6. As an article of manufacture, a spindle support and spindle for an earth boring drill said spindle having thereon a frusto-conical raceway surface for roller bearings tapering towards the support, another raceway on said spindle and a thrust sustaining bearing surface.

7. A roller cutter for an earth boring drill comprising a toothed exterior and a bore having a plurality of raceway bearing surfaces, said bore being closed at one end, and a groove in said bore wholly defined by two intersecting surfaces, each of which surfaces is inclined to the cutter axis, in combination with a shouldered spindle and frusto-conical anti-friction rollers, one end face of which bears only on one of the intersecting surfaces and the other end face of which bears only on the shoulder on the spindle, the other of said intersecting surfaces of the roller cutter serving as a raceway for the frusto-conical rollers, substantially as described.

8. A roller cutter for an earth boring drill comprising a toothed exterior having teeth in a base zone, said teeth being comparatively wide, and teeth in another zone arranged in widely spaced apart circumferential rows, the axis of the cutter being arranged for positioning inclined to the axis of the drill, said cutter having a plurality of roller bearing raceway surfaces in its bore and a groove for retaining means, said groove being formed by two intersecting surfaces, each of which surfaces is inclined to the cutter axis, said retaining means consisting of frusto-conical members rolling on one of said intersecting surfaces.

9. As an article of manufacture, a spindle support and spindle for an earth boring drill, said spindle comprising a body portion having thereon a frusto-conical raceway surface tapering towards the support, a roller cutter, and tapered roller bearings positioned on said raceway surface and between said spindle and said cutter, the smaller ends of said tapered roller bearings being directed towards the said spindle support.

10. An article of manufacture according to claim 9 and other rolling bearings between the cutter and the spindle.

11. A rotary earth boring drill comprising a spindle, a toothed non-true rolling cutter turning about said spindle, having a pronounced end thrust inwardly towards the vertical axis of the drill, and frusto-conical anti-friction rollers between the roller cutter and the spindle having their larger diameter ends inwardly towards the vertical axis of the drill, taking said inward end thrust through a complementary raceway in the cutter and imposing the same upon a complementary frusto-conical raceway on the spindle.

12. A rotary earth boring drill according to claim 11 in which the spindle is arranged with its axis at a comparatively low angle to the horizontal.

13. A rotary earth boring drill according to claim 11 in which the cutter has a toothed base zone at an angle to a toothed conical apex portion, substantially as described.

14. In an earth boring drill, a roller cutter of substantially frusto-conical shape having an interior bore closed at one end and having an interior bearing surface of frusto-conical shape tapering toward the open end of the cutter for cooperation with frusto-conical roller bearings.

15. A roller cutter mounting comprising a spindle, a roller cutter enclosing said spindle, frusto-conical roller bearings between said spindle and cutter, said cutter having an opening for the insertion of said roller bearings, said opening extending along the axis of one of said roller bearings.

16. A roller cutter mounting comprising a spindle located to one side of the vertical axis of the drill, a support at one end of the spindle, a one piece roller cutter enclosing said spindle and located to one side of the vertical axis of the drill, tapered roller bearings between said cutter and spindle, said cutter having an opening through its wall for the insertion of said tapered roller bearings, said opening extending along the axis of one of said roller bearings, and a set of rolling bearings located in a zone between said roller bearings and the support, said roller bearings and rolling bearings having between them a portion of the wall of the cutter.

17. In a roller cutter organization for an earth boring apparatus, a roller cutter, a frusto-conical roller bearing positioned with the larger ends of the frusto-conical rollers towards the axis of the apparatus and a spindle having a frusto-conical surface on which said rollers bear, the larger diameter part of said surface being nearer to said axis than the smaller diameter part of said surface for sustaining end thrusts of the cutter inwardly of the apparatus.

18. In a roller cutter organization for earth boring apparatus, a spindle, a toothed roller cutter and anti-friction roller bearings between the spindle and the cutter comprising a set of rollers taking radial loads, and a set of frusto-conical rollers arranged with their larger diameter ends towards the vertical axis about which the apparatus rotates taking end thrust of the cutter inwardly towards said vertical axis.

19. A roller cutter for an earth boring drill comprising a toothed exterior and a bore closed at one end and open at the other, and having a plurality of bearing surfaces, one of said surfaces being a cylindrical raceway bearing surface and another of said surfaces being a tapered raceway bearing surface with the smaller end of said tapered surface towards the open end of the bore.

20. A roller cutter for an earth boring drill comprising a toothed exterior and a bore closed at one end and open at the other, and having a plurality of bearing surfaces, one of said surfaces being a tapered raceway bearing surface for frusto-conical roller bearings with the smaller end of said tapered surface towards the open end of said bore, and said tapered surface positioned in said bore between two other roller bearing raceway surfaces.

CLARENCE E. REED.